Jan. 9, 1968        W. R. COBB        3,362,737

FASTENING ARRANGEMENT

Filed June 17, 1965

WITNESSES
Theodore F. Wrobel
James F. Young

INVENTOR
William R. Cobb
BY Edward C. Gray
ATTORNEY 3,362,737
FASTENING ARRANGEMENT
William R. Cobb, Columbus, Ohio, assignor to Westinghouse Electric Corporation, Pittsburgh, Pa., a corporation of Pennsylvania
Filed June 17, 1965, Ser. No. 464,640
4 Claims. (Cl. 287—189.36)

ABSTRACT OF THE DISCLOSURE

A fastening arrangement for a sheet metal panel having a rearwardly-directed dimple surrounding an opening therein including a washer having a plurality of teeth cooperating with the dimple to secure a sheet metal screw to the panel.

---

This invention relates to an improved arrangement for fastening parts to a light gauge sheet metal panel by means of a self-tapping sheet metal screw.

It is a common practice in fastening a part to a sheet metal panel to provide a rearwardly-directed dimple in the panel about the opening which receives the self-tapping sheet metal screw which secures the part to the panel. With relatively lighter gauge sheet metal, difficulty has been experienced in obtaining a secure connection by reason of the dimple collapsing or inverting if the sheet metal screw is turned too far, and in a loose connection if the sheet metal screw is not turned far enough. Prevention of the inversion of the dimple has largely depended, in the past, upon the skill of the assembler.

The object of this invention is the provision of an arrangement which permits greater latitude in the degree to which the screw may be tightened without a corresponding degree of failure of the connection.

I attain this object and others by providing a hardened washer having an inner annular portion which is countersunk to generally nest in the dimple recess, and with the inner edge of the countersunk portion provided with spaced teeth which engage the inner rim of the dimple upon tightening of the screw. The countersunk portion backs up the dimple, and it has been found that the internal teeth increase the stripping torque considerably by effectively allowing the panel material in the area immediately around the screw shank to more or less extrude into the spaces between the teeth. This of course binds the screw and reduces the possibility of the screw coming loose.

The invention will be described in connection with the accompanying drawing illustrating one embodiment by way of example, and wherein.

Figure 1:
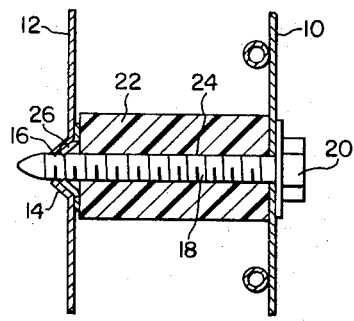
FIGURE 1 is a fragmentary, sectional view of a fastener arrangement according to the invention.

In FIG. 1, the fastener arrangement is shown as applied to secure a wire and tube condenser assembly 10 to the rear panel 12 of a refrigerator cabinet. The rear panel is of relatively light gauge metal and is provided in selected areas with a dimple 14 having a central opening 16 sized to accommodate the shank 18 of the self-tapping sheet metal screw 20. A standoff 22 provided with a central bore 24 through which the screw shank extends is used to space the condenser assembly from the refrigerator rear panel.

The washer 26, which seats between the end of the standoff 22 and the panel 12, and which is the heart of the fastener arrangement according to the invention, has a countersunk inner portion 28 which generally nests in the recess provided by the dimple 14, and a planar outer portion 30 of greater outer diameter than the outer diameter of the dimple 16. The internal teeth 32 at the rim of the inner annular portion frame a central clearance opening through which the shank of the screw freely passes in assembly.

Figure 3:
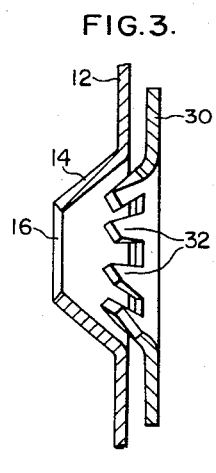
FIG. 3 is a sectional view of the washer and adjacent panel fastening area, this view corresponding to one taken along the line III—III of FIG. 2.
Figure 2:
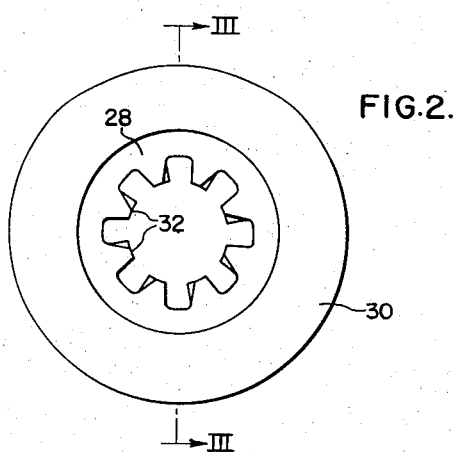
FIG. 2 is an enlarged face view of the washer element formed according to the invention.

As may be seen clearly in FIGS. 2 and 3, the teeth 32 are spaced from each other a substantial distance to provide generous gaps therebetween about equal in width to the width of the teeth. Each tooth is preferably twisted from its original countersunk position to a displaced position of about 40°, and in a direction that is opposed to the screw threaded helix (i.e., with the usual right hand thread on the sheet metal screw, the teeth are twisted into planes which would coincide with a left hand screw thread).

As may be seen in FIG. 3, the diameter of the clearance opening in the washer is greater than the diameter of the dimple opening 16 so that the extremities of the teeth are disposed to engage the panel material bordering the dimple opening 16. In the assembled position, turning of the screw into its finally tightened position results in some minute portions of the panel material adjacent the opening 16 effectively being extruded into the spaces between adjacent teeth of the washer. As a result the stripping torque of the fastener is increased, and inversion and collapsing failure of the dimple are substantially precluded.

It will be appreciated that the extended-surface seating or sandwiching of the outer annular portion of the washer prevents the central part of the washer from being tilted by the force tending to invert the dimple as the screw is tightened.

Figure 4:
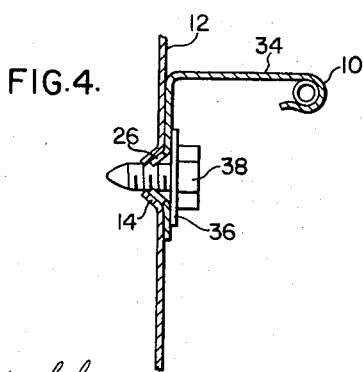
FIG. 4 is a fragmentary sectional view of a fastener arrangement according to the invention applied in another way.

FIG. 4 shows another arrangement in which the countersunk, toothed washer of the character shown in FIGS. 2 and 3 is formed as an integral part of a bracket 34 which is to be secured to a light gauge panel. In this case it will again be appreciated that the washer should include the planar extended-surface area which seats against the panel and is held by the washer face 36 of the screw 38.

I claim as my invention:

1. A fastening arrangement comprising: a relatively light gauge sheet metal panel having a rearwardly-directed circular dimple circumscribing a circular opening adapted to receive a threaded fastener; a threaded fastener in the form of a self-tapping sheet metal screw having a major diameter greater than that of said opening; a washer having a planar, outer annular portion with an outer diameter greater than the outer diameter of said dimple, and an inner annular portion countersunk to generally nest in said dimple, said inner portion having a plurality of spaced internal teeth defining an opening of greater diameter than said dimple opening and of greater diameter than the outer diameter of the threads of said fastener, said internal teeth being disposed to engage the annular border of said dimple adjacent said dimple opening upon tightening of said screw to said panel to resist inversion of said dimple.

2. A fastener arrangement according to claim 1 wherein: said teeth are twisted out of their initial countersunk positions.

3. A fastener arrangement according to claim 2 wherein: said teeth in their twisted positions are oppositely pitched with respect to the direction of pitch of said screw threads.

4. A fastener arrangement according to claim 3 wherein: adjacent ones of said teeth are spaced apart a distance about equal to the width of each tooth.

References Cited

UNITED STATES PATENTS

| 1,788,735 | 1/1931 | Olson | 151—35 |
| 1,909,475 | 5/1933 | Olson | 151—35 |
| 1,926,686 | 9/1933 | Newton | 85—41 |

EDWARD C. ALLEN, *Primary Examiner.*

R. S. BRITTS, *Assistant Examiner.*